United States Patent
Boucher et al.

(10) Patent No.: US 11,754,021 B2
(45) Date of Patent: Sep. 12, 2023

(54) PROPULSION SYSTEMS FOR AIRCRAFT

(71) Applicant: Raytheon Technologies Corporation, Farmington, CT (US)

(72) Inventors: Amanda Jean Learned Boucher, Cambridge, MA (US); Joseph B. Staubach, Colchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/407,880

(22) Filed: Aug. 20, 2021

(65) Prior Publication Data

US 2023/0056536 A1    Feb. 23, 2023

(51) Int. Cl.
*F02K 3/115* (2006.01)
*F02K 3/06* (2006.01)

(52) U.S. Cl.
CPC ........... *F02K 3/115* (2013.01); *F02K 3/06* (2013.01); *F05D 2220/323* (2013.01); *F05D 2240/35* (2013.01); *F05D 2260/213* (2013.01); *F05D 2260/232* (2013.01); *F05D 2260/606* (2013.01)

(58) Field of Classification Search
CPC .. F01K 25/103; F02C 1/04; F02C 1/10; F02C 3/34; F02K 3/077; F02K 3/06; F02K 3/115; F05D 2220/323; F05D 2240/35; F05D 2260/213; F05D 2260/232; F05D 2260/606
See application file for complete search history.

(56) References Cited

U.S. PATENT DOCUMENTS

| | | | |
|---|---|---|---|
| 9,014,791 B2* | 4/2015 | Held | F02C 3/34 600/476 |
| 9,885,283 B2 | 2/2018 | Vaisman et al. | |
| 9,982,629 B2 | 5/2018 | Armstrong et al. | |
| 10,584,635 B2 | 3/2020 | Armstrong et al. | |
| 2014/0356340 A1 | 12/2014 | Burbidge et al. | |
| 2016/0123226 A1* | 5/2016 | Razak | F02C 7/18 60/39.15 |
| 2017/0058834 A1* | 3/2017 | Vaisman | F02K 3/06 |
| 2017/0101931 A1* | 4/2017 | Armstrong | F02C 7/185 |
| 2017/0356340 A1* | 12/2017 | Vaisman | F02C 1/10 |

(Continued)

OTHER PUBLICATIONS

G. D. Brewer, "Hydrogen Aircraft Technology," © 1991 by CRC Press, Inc. (Year: 1991).*

(Continued)

*Primary Examiner* — Todd E Manahan
*Assistant Examiner* — David P. Olynick
(74) *Attorney, Agent, or Firm* — CANTOR COLBURN LLP

(57) ABSTRACT

Aircraft propulsion systems including a closed loop-supercritical fluid system having a turbine, a cooler heat exchanger, a compressor, and a recovery heat exchanger arranged along a closed-loop flow path of a supercritical fluid. A shaft is operably coupled to the turbine and configured to be rotationally driven by the turbine. A fan is configured to generate thrust, the fan operably coupled to the shaft to be rotationally driven by the shaft. A burner is configured to combust a fuel and air from the fan to generate a combusted gas and supply said combusted gas to the recovery heat exchanger of the closed loop-supercritical fluid system and out an exhaust nozzle.

19 Claims, 6 Drawing Sheets

(56) References Cited

U.S. PATENT DOCUMENTS

2021/0207537 A1\* 7/2021 Roberge .................... F02C 9/40
2021/0340910 A1\* 11/2021 MacDonald .............. F02C 6/20

OTHER PUBLICATIONS

European Search Report for European Application No. 22190642.3; Date of Search: Jan. 13, 2023; Date of Notification: Jan. 24, 2023; 6 pages.

\* cited by examiner

PROPULSION SYSTEMS FOR AIRCRAFT

TECHNICAL FIELD

The present disclosure relates generally to aircraft propulsion systems.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some configurations, a fan is also connected to the shaft and is driven to rotate via rotation of the turbine.

However, such gas turbine engines generate waste products, such as $CO_2$. It may be advantageous to have aircraft propulsion systems that do not generate waste byproducts or generate less waste, including $CO_2$.

BRIEF SUMMARY

According to some embodiments, aircraft propulsion systems are provided. The aircraft propulsion systems include a closed loop-supercritical fluid system having a turbine, a cooler heat exchanger, a compressor, and a recovery heat exchanger arranged along a closed-loop flow path of a supercritical fluid. A shaft is operably coupled to the turbine and configured to be rotationally driven by the turbine. A fan is configured to generate thrust, the fan operably coupled to the shaft to be rotationally driven by the shaft. A burner is configured to combust a fuel and air from the fan to generate a combusted gas and supply said combusted gas to the recovery heat exchanger of the closed loop-supercritical fluid system and out an exhaust nozzle.

In addition to one or more of the features described above, or as an alternative, further embodiments of the aircraft propulsion systems may include that the supercritical fluid is CO2 that is passed through the turbine, the cooler heat exchanger, the compressor, and the recovery heat exchanger.

In addition to one or more of the features described above, or as an alternative, further embodiments of the aircraft propulsion systems may include a gear system coupled to the shaft between the turbine and the fan.

In addition to one or more of the features described above, or as an alternative, further embodiments of the aircraft propulsion systems may include that the compressor of the closed loop-supercritical fluid system is arranged on the shaft and rotationally driven by the shaft.

In addition to one or more of the features described above, or as an alternative, further embodiments of the aircraft propulsion systems may include that the closed loop-supercritical fluid system further comprises a recuperator heat exchanger arranged between the turbine and the cooler heat exchanger along the closed-loop flow path.

In addition to one or more of the features described above, or as an alternative, further embodiments of the aircraft propulsion systems may include that the recuperator heat exchanger is a supercritical fluid-to-supercritical fluid heat exchanger.

In addition to one or more of the features described above, or as an alternative, further embodiments of the aircraft propulsion systems may include a diffuser conduit arranged between the burner and the recovery heat exchanger, the diffuser conduit configured to slow down and event out a profile of a flow of the combusted gas prior to entry into the recovery heat exchanger.

In addition to one or more of the features described above, or as an alternative, further embodiments of the aircraft propulsion systems may include a cryogenic fuel tank configured to supply fuel to the burner through a fuel flow path, wherein the cooler heat exchanger is a fuel-to-supercritical fluid heat exchanger.

In addition to one or more of the features described above, or as an alternative, further embodiments of the aircraft propulsion systems may include a turbo expander operably coupled to the shaft and arranged between the cryogenic fuel tank and the burner.

In addition to one or more of the features described above, or as an alternative, further embodiments of the aircraft propulsion systems may include that the cooler heat exchanger is an air-to-supercritical fluid heat exchanger.

In addition to one or more of the features described above, or as an alternative, further embodiments of the aircraft propulsion systems may include that the cooler heat exchanger is arranged within a bypass duct downstream of the fan.

According to some embodiments, aircraft propulsion systems are provided. The aircraft propulsion systems include a bypass flow path defining a flow path of air that passes through an air inlet, through a fan coupled to a shaft, through a bypass duct, and out a bypass nozzle, a hot gas flow path defining a flow path of air that passes through the air inlet, through the fan, into a burner for combustion with fuel to generate combusted gas, and through a recovery heat exchanger, and out a hot stream nozzle, and a closed-loop flow path defining a closed-loop flow path of a supercritical fluid that passes through a turbine operably coupled to the shaft to drive rotation of the shaft, a cooler heat exchanger, a compressor coupled to the shaft, into the recovery heat exchanger, and back to the turbine. The turbine of the closed-loop flow path drives rotation of the shaft, the compressor, and the fan.

In addition to one or more of the features described above, or as an alternative, further embodiments of the aircraft propulsion systems may include a fuel flow path defining a flow path from a fuel tank to the burner of the hot gas flow path.

In addition to one or more of the features described above, or as an alternative, further embodiments of the aircraft propulsion systems may include a turbo expander coupled to the shaft and configured to expand a fuel prior to injection into the burner.

In addition to one or more of the features described above, or as an alternative, further embodiments of the aircraft propulsion systems may include a first gear system coupled to the shaft between the turbine and the turbo expander and a second gear system coupled to the shaft between the turbo expander and the fan.

In addition to one or more of the features described above, or as an alternative, further embodiments of the aircraft propulsion systems may include that a fuel in the fuel flow path is cryogenic fuel.

In addition to one or more of the features described above, or as an alternative, further embodiments of the aircraft propulsion systems may include that the cryogenic fuel is hydrogen.

In addition to one or more of the features described above, or as an alternative, further embodiments of the aircraft propulsion systems may include that the cooler heat exchanger of the closed-loop flow path receives fuel to form a fuel-to-supercritical fluid heat exchanger.

In addition to one or more of the features described above, or as an alternative, further embodiments of the aircraft propulsion systems may include a gear system coupled to the shaft between the turbine and the fan.

In addition to one or more of the features described above, or as an alternative, further embodiments of the aircraft propulsion systems may include that the hot gas flow path further comprises a blower arranged between the fan and the burner to increase a speed of the air passing through the hot gas flow path.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
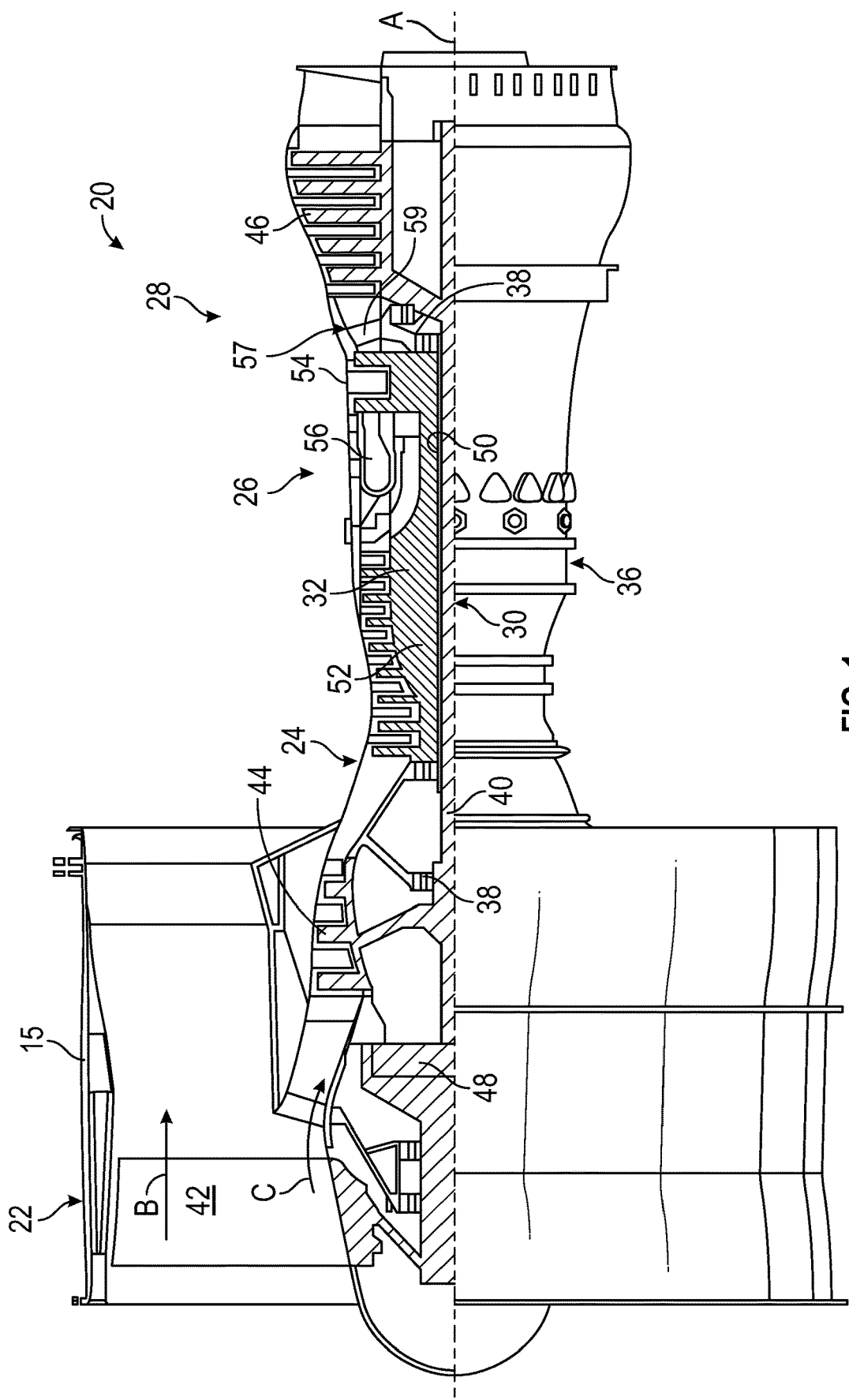
FIG. 1 is a schematic cross-sectional illustration of a gas turbine engine architecture.

FIG. 1 schematically illustrates a gas turbine engine 20. As illustratively shown, the gas turbine engine 20 is configured as a two-spool turbofan that has a fan section 22, a compressor section 24, a combustor section 26, and a turbine section 28. The illustrative gas turbine engine 20 is merely for example and discussion purposes, and those of skill in the art will appreciate that alternative configurations of gas turbine engines may employ embodiments of the present disclosure. The fan section 22 includes a fan 42 that is configured to drive air along a bypass flow path B in a bypass duct defined within a nacelle 15. The fan 42 is also configured to drive air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

In this two-spool configuration, the gas turbine engine 20 includes a low speed spool 30 and a high speed spool 32 mounted for rotation about an engine central longitudinal axis A relative to an engine static structure 36 via one or more bearing systems 38. It should be understood that various bearing systems 38 at various locations may be provided, and the location of bearing systems 38 may be varied as appropriate to a particular application and/or engine configuration.

The low speed spool 30 includes an inner shaft 40 that interconnects the fan 42 of the fan section 22, a first (or low) pressure compressor 44, and a first (or low) pressure turbine 46. The inner shaft 40 is connected to the fan 42 through a speed change mechanism, which, in this illustrative gas turbine engine 20, is as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the combustor section 26 between the high pressure compressor 52 and the high pressure turbine 54. A mid-turbine frame 57 of the engine static structure 36 is arranged between the high pressure turbine 54 and the low pressure turbine 46. The mid-turbine frame 57 may be configured to support one or more of the bearing systems 38 in the turbine section 28. The inner shaft 40 and the outer shaft 50 are concentric and rotate via the bearing systems 38 about the engine central longitudinal axis A which is collinear with their longitudinal axes.

The core airflow through core airflow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 (e.g., vanes) which are arranged in the core airflow path C. The turbines 46, 54 rotationally drive the respective low speed spool 30 and high speed spool 32 in response to the expansion of the core airflow. It will be appreciated that each of the positions of the fan section 22, the compressor section 24, the combustor section 26, the turbine section 28, and geared architecture 48 or other fan drive gear system may be varied. For example, in some embodiments, the geared architecture 48 may be located aft of the combustor section 26 or even aft of the turbine section 28, and the fan section 22 may be positioned forward or aft of the location of the geared architecture 48.

The gas turbine engine 20 in one example is a high-bypass geared aircraft engine. In some such examples, the gas turbine engine 20 has a bypass ratio that is greater than about six (6), with an example embodiment being greater than about ten (10). In some embodiments, the geared architecture 48 is an epicyclic gear train, such as a planetary gear system or other gear system, with a gear reduction ratio of greater than about 2.3 and the low pressure turbine 46 has a pressure ratio that is greater than about five (5). In one non-limiting embodiment, the bypass ratio of the gas turbine engine 20 is greater than about ten (10:1), a diameter of the fan 42 is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle. In some embodiments, the geared architecture 48 may be an epicycle gear train, such as a planetary gear system or other gear system, with a gear reduction ratio of greater than about 2.3:1. It should be understood, however, that the above parameters are only for example and explanatory of one non-limiting embodiment of a geared architecture engine and that the present disclosure is applicable to other gas turbine engines including turbojets or direct drive turbofans or turboshafts.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

As noted above, conventional gas turbine engines, such as shown in FIG. 1, generate waste heat and chemicals. However, it is difficult to achieve zero carbon emission flight. Embodiments of the present disclosure are directed to propulsion systems that have reduced or no emissions and achieve a high thermal efficiency. Additionally, low altitude thrust lapse is a problem caused by a density drop that air experiences in a traditional jet engine. However, altitude-invariant engines do not currently exist. Embodiments, of the present disclosure are directed to closed loop $CO_2$ propulsion systems that can provide a system of effectively no lapse due to altitude.

Embodiments of the present disclosure are directed to supercritical fluid closed-loop driven turbofan arrangements to generate propulsion for an aircraft. In some embodiments, the supercritical fluid may be $CO_2$. In operation, air will enter the system and a blower fan will be used as a booster for air that is heated by a burner (e.g., a convention combustion chamber). A duct behind the burner allows the air to even out or to become uniform (or more uniform), prior to entering an annular heat exchanger that will heat the fluid of a closed-loop supercritical fluid system. For example, the pressure and temperature profiles may become more uniform (e.g., inner diameter to outer diameter and circumferentially) upon entering the heat exchanger or otherwise substantially uniform across whatever shape defines an entrance to the heat exchanger. The duct or diffuser conduit diffuses the flow resulting in a reduced flow velocity and more even flow profile. The supercritical fluid system includes a turbine on a shaft that is operably connected to the blower and a bypass air fan. In some embodiments, one or more gear systems are arranged between the turbine and the blower and/or bypass air fan to ensure proper gearing and transition of power from the turbine to the blower/fan. For aircraft propulsion, the bypass air provides most of the engine thrust. In some embodiments, a turboexpander could be added to the system. In some such embodiments, the turboexpander may be used to expand a cryogenic fuel (e.g., hydrogen, methane, etc.) prior to combustion within the burner. The turboexpander may be driven on the same shaft driven by the closed-loop turbine, upstream relative to the burner, and may be arranged to extract additional work within the system. In some embodiments, heat not recovered by the supercritical fluid closed-loop system may be recovered by an additional heat exchanger downstream (prior to atmosphere), to then use that recovered heat within a cryogenic fuel system. In one non-limiting example in accordance with the present disclosure, a $CO_2$ closed-loop system will only be heated to a $CO_2$ system optimum efficiency (e.g., about 1500° F.).

Figure 2:
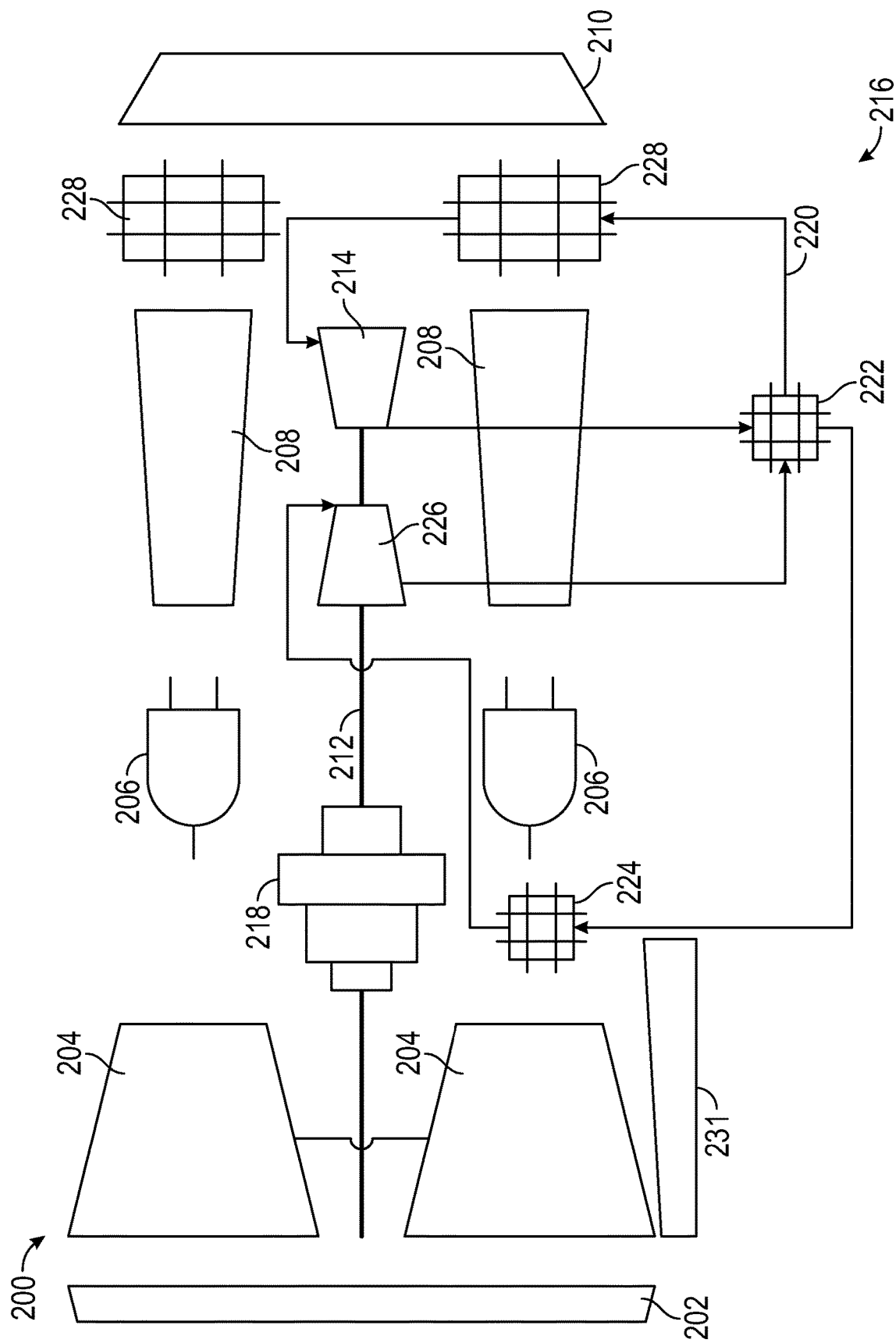
FIG. 2 is a schematic diagram of an aircraft propulsion system in accordance with an embodiment of the present disclosure.

Turning now to FIG. 2, a schematic diagram of an aircraft propulsion system 200 in accordance with an embodiment of the presents disclosure is shown. The aircraft propulsion system 200 may be configured to be mounted to an aircraft to generate propulsive force for flight. The aircraft propulsion system 200 includes an air inlet 202, a fan 204 (and/or low pressure compressor), a burner 206, a diffuser conduit 208, and an exhaust nozzle 210. The fan 204 is arranged along a shaft 212 that is driven by a turbine 214. The turbine 214 is part of a closed loop-supercritical fluid system 216. A gearing system 218 is arranged between the turbine 214 and the fan 204 along the shaft 212. The gearing system 218 is configured to transition from a high speed rotation from the turbine 214 to a lower speed rotation for the fan 204.

The closed loop-supercritical fluid system 216 is a closed loop system containing a supercritical fluid within a fluid line 220. In some non-limiting embodiments, the supercritical fluid may be $CO_2$. Along the fluid line 220 the closed loop-supercritical fluid system 216 includes the turbine 214, an optional recuperator heat exchanger 222, a cooler heat exchanger 224, a compressor 226, and a recovery heat exchanger 228. As the supercritical fluid passes through the fluid line 220 it will drive the turbine 214 which in turn drives rotation of the shaft 212. The compressor 226 and the fan 204 are coupled to the shaft 212 and thus are driven by the turbine 214.

Starting at the turbine 214, the supercritical fluid will be directed to the optional recuperator heat exchanger 222. The recuperator heat exchanger 222 is a supercritical fluid-to-supercritical fluid heat exchanger with both flow paths through the recuperator heat exchanger 222 containing the supercritical fluid. The supercritical fluid will then flow into the cooler heat exchanger 224, or directly to the cooler heat exchanger 224 if no recuperator heat exchanger 222 is present. The cooler heat exchanger 224 is configured to cool the supercritical fluid. As such, the cooler heat exchanger 224 may be an air-to-supercritical fluid or fuel-to-supercritical fluid heat exchanger. In operation, the cooler heat exchanger 224 is employed to reject heat of the supercritical fluid (e.g., $sCO_2$) into the air stream forward of the burner 206 and is then recovered into the air stream that feeds the recovery heat exchanger 228. Optionally, in an air-to-supercritical fluid configuration, the cooler heat exchanger 224 may be arranged in a duct, such as a bypass duct or bypass stream 231 of the aircraft propulsion system 200, such as downstream from the air inlet 202 and downstream of the fan 204. In such a configuration the bypass duct would direct air from the air inlet 202 toward the exhaust nozzle 210 without the air interacting with other components and, in some embodiment, may be the primary thrust generator of the aircraft propulsion system 200. In the fuel-to-supercritical fluid, the cooler heat exchanger 224 may receive a fuel to be provided into the burner 206 for combustion and provide heat exchange between the fuel and the supercritical fluid. In some embodiments, the fuel may be jet fuel, biofuels, or cryogenic fuels (e.g., hydrogen, methane, etc.).

The supercritical fluid will then pass into the compressor 226, which is driven on the shaft 212 by the turbine 214. The supercritical fluid will then flow through the optional recuperator heat exchanger 222, if present, and into the recovery heat exchanger 228. The recovery heat exchanger 228 may be an annular structure arranged about and/or proximate to the exhaust nozzle 210. Hot gases from the burner(s) 206 will flow along the diffuser conduit 208 and into the recovery heat exchanger 228. The supercritical fluid will experience heat pickup within the recovery heat exchanger 228 which takes advantage of the waste heat generated by the burner(s) 206. The heated supercritical fluid will then enter the turbine 214 and drive rotation thereof.

There are two primary fluid paths through the aircraft propulsion system 200. First, there is the closed loop-supercritical fluid system 216. This closed loop-supercritical fluid system 216 provides the primary driving force for rotating the shaft 212. The second is an air flow path that passes through the aircraft propulsion system 200. The bulk of the air will enter at the air inlet 202, be driven by the fan 204, and then pass through a bypass channel to provide thrust. A portion of the air will be directed from the fan 204 into the burn 206 to be combusted with a fuel, such as jet fuel, hydrogen, or the like. The combusted fuel and air will be passed into and through the diffuser conduit 208 prior to entering the recovery heat exchanger 228 and then exit the aircraft propulsion system 200 through the exhaust nozzle 210. This exhaust will generate some amount of thrust to supplement the primary thrust generator in a bypass, with the bypass being similar to that shown and described with respect to FIG. 1 and/or as otherwise described herein.

The aircraft propulsion system 200 is distinct from prior gas turbine engines, particularly in that the primary driving force to drive the fan 202 is not a convention combustor-turbine configuration. The combusted fuel is not the primary driving force, but rather the closed-loop cycle of the closed loop-supercritical fluid system 216 provides the motive force to drive the fan 202 and generate thrust for flight. Advantageously, because the closed loop-supercritical fluid system 216 is a closed-loop system, there is no requirement for a direct fuel injection or reliance upon the fuel itself. The closed-loop cycle enables elimination of efficiency dependency that is due to a density drop associated with altitude changes when using traditional jet engines. That is, the aircraft propulsion system 200 provides for an altitude-invariant engine. As a result, embodiments of the present disclosure provide for systems having effectively no efficiency lapse due to altitude.

Figure 3:
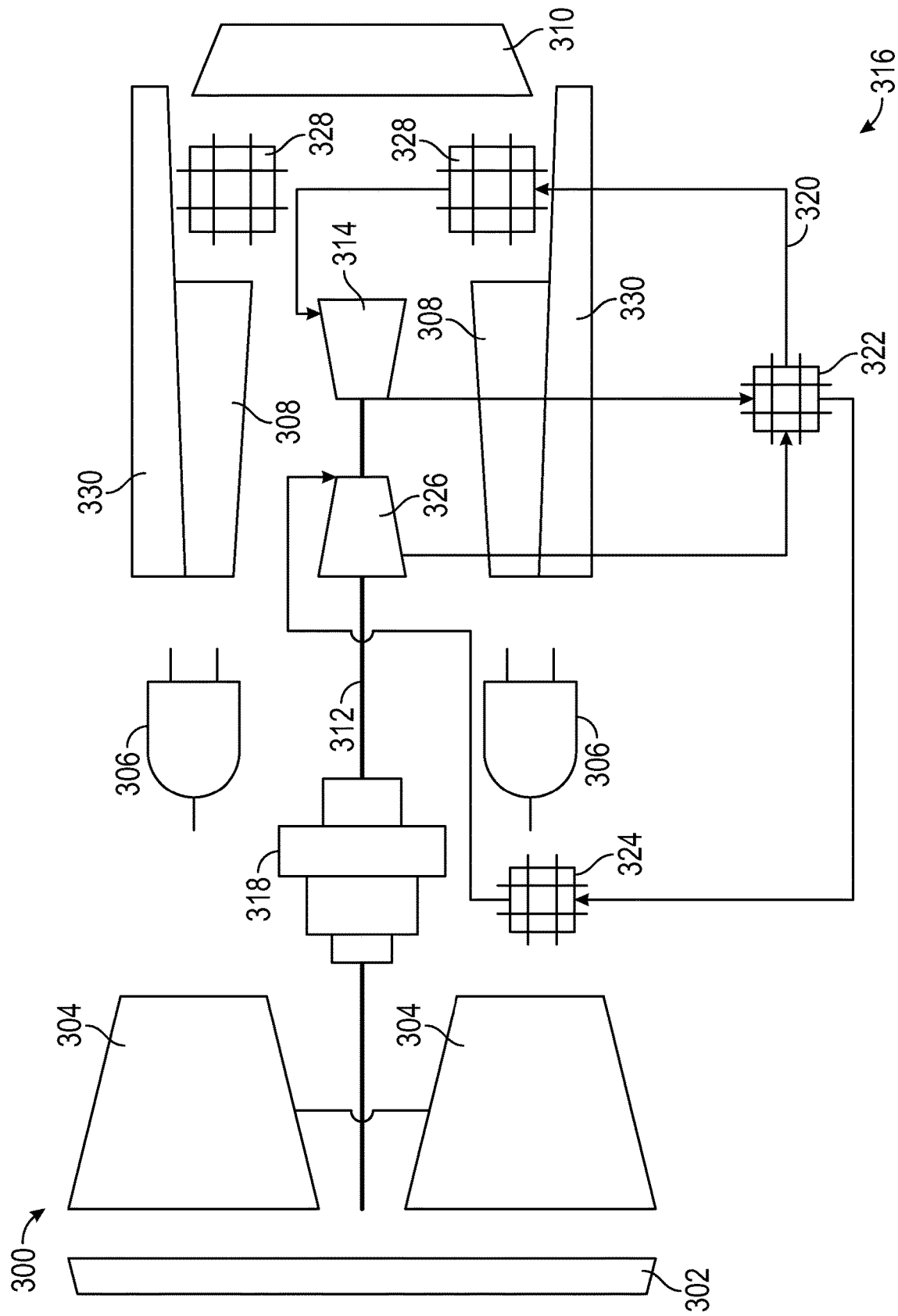
FIG. 3 is a schematic diagram of an aircraft propulsion system in accordance with an embodiment of the present disclosure.

Turning now to FIG. 3, a schematic diagram of an aircraft propulsion system 300 in accordance with an embodiment of the presents disclosure is shown. The aircraft propulsion system 300 may be substantially similar to that shown in FIG. 2. The aircraft propulsion system 300 includes an air inlet 302, a fan 304 (and/or low pressure compressor), a burner 306, a diffuser conduit 308, and an exhaust nozzle 310. The fan 304 is arranged along a shaft 312 that is driven by a turbine 314 of a closed loop-supercritical fluid system 316, similar to that described above. A gearing system 318 is arranged between the turbine 314 and the fan 304 along the shaft 312. The gearing system 318 is configured to transition a high speed rotation from the turbine 314 to a lower speed rotation for the fan 304.

The closed loop-supercritical fluid system 316 is a closed loop system containing a supercritical fluid within a fluid line 320. Along the fluid line 220 the closed loop-supercritical fluid system 316 includes the turbine 314, an optional recuperator heat exchanger 322, a cooler heat exchanger 324, a compressor 326, and a recovery heat exchanger 328. Similar to the above described configurations, the cooler heat exchanger 324 may be arranged between the fan 304 and the burner 306. As such, heat from the supercritical fluid may be rejected into the air stream forward of the burner 306 and be recovered into the air stream that feeds the recovery heat exchanger 228. In some embodiments, the cooler heat exchanger 224 can be optionally arranged within a bypass stream of the system. As the supercritical fluid passes through the fluid line 320 it will drive the turbine 314 which in turn drives rotation of the shaft 312. The compressor 326 and the fan 304 are coupled to the shaft 312 and thus are driven by the turbine 314.

In this embodiment, a heat exchanger bypass 330 is arranged along the flow path of the air that passes from the fan 304 to the exhaust nozzle 310. As such, a portion of the combusted gases exiting the burner 306 may be used to provide additional thrust, without a portion of the energy extracted within the recovery heat exchanger 328. As such, this configuration can potentially generate additional thrust through air passing through the heat exchanger bypass 330. In this configuration, the size of the recovery heat exchanger 328 may be smaller than the similar recovery heat exchanger 228 in the configuration of FIG. 2. This is because less air is passing through the recovery heat exchanger 328 and thus weight savings may be achieved, while also gaining increased thrust potential.

Figure 4:
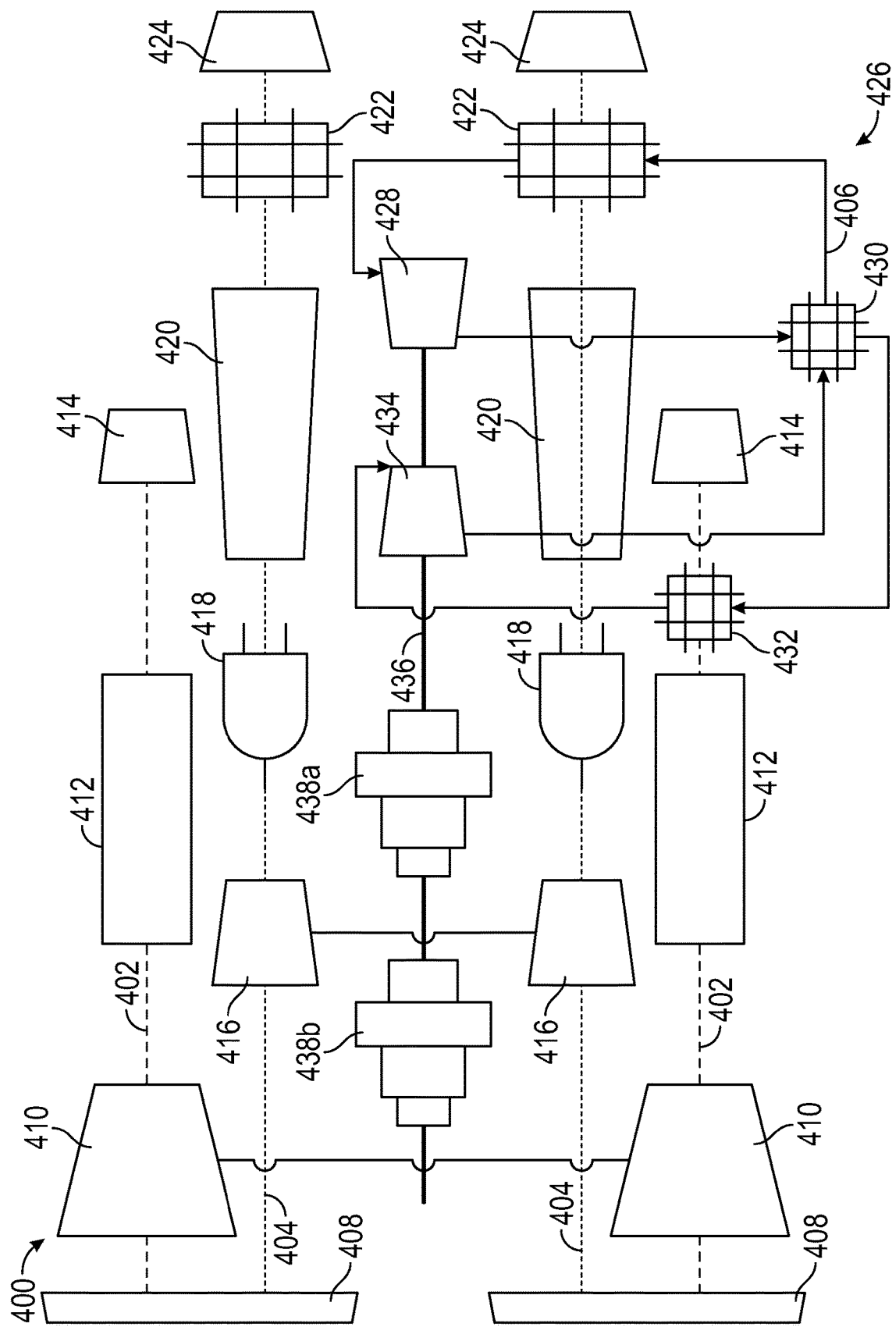
FIG. 4 is a schematic diagram of an aircraft propulsion system in accordance with an embodiment of the present disclosure.

Turning now to FIG. 4, a schematic diagram of an aircraft propulsion system 400 in accordance with an embodiment of the presents disclosure is shown. The aircraft propulsion system 400 may be similar in function as those described above. In this illustrative embodiment, there are three main flow paths of fluids through the aircraft propulsion system 400. The aircraft propulsion system 400 includes a bypass flow path 402, a hot gas flow path 404, and a closed-loop flow path 406.

The bypass flow path 402 is an air flow path that generates the majority of the thrust for the aircraft propulsion system 400. Air enters the bypass flow path 402 at an air inlet 408. The air is driven by a rotating fan 410 into a bypass duct 412. The air is then ejected or driven out of a bypass nozzle 414.

The hot gas flow path 404 is also an air flow path that is used to generate heat for the aircraft propulsion system 400. Air is sourced from the air inlet 408, passed through the fan 410, and is accelerated through an optional blower 416. The accelerated air is then passed through a burner 418 where the air is mixed and combusted with a fuel. The hot combusted gas is then passed through a hot stream duct 420 where the flow evens out and reduces turbulence prior to entering a recovery heat exchanger 422 and ejected out a hot stream nozzle 424.

The closed-loop flow path 406 is part of a closed loop-supercritical fluid system 426 and contains a supercritical fluid within a fluid line. The closed loop-supercritical fluid system 426 includes a turbine 428, an optional recuperator heat exchanger 430, a cooler heat exchanger 432, a compressor 434, and the recovery heat exchangers 422. As the supercritical fluid passes through the closed-loop flow path 406 it will drive the turbine 428 which in turn drives rotation of a shaft 436.

The compressor 434 of the closed-loop flow path 406, the optional blower 416 of the hot gas flow path 404, and the fan 410 of the bypass flow path 402 are each coupled to the shaft 436 and thus are driven by the turbine 428. The shaft 436 may include one or more gear systems 438a, 438b. The gear systems 438a, 438b may be configured to step the rotational speed of the shaft to appropriately drive the optional blower 416 and/or the fan 410. For example, in some non-limiting embodiments, the gear systems may be configured to provide an overall gear ratio across both gear systems 438a, 438b between 10:1 to 20:1, although other gear ratios and gearing may be employed without departing from the scope of the present disclosure, as will be appreciated by those of skill in the art.

In this illustrative embodiment, the cooler heat exchanger 432 of the closed-loop flow path 406 is arranged within the bypass duct 412 of the bypass flow path 402. As such, the cooler heat exchanger 432 in this embodiment is an air-to-supercritical fluid heat exchanger.

Figure 5:
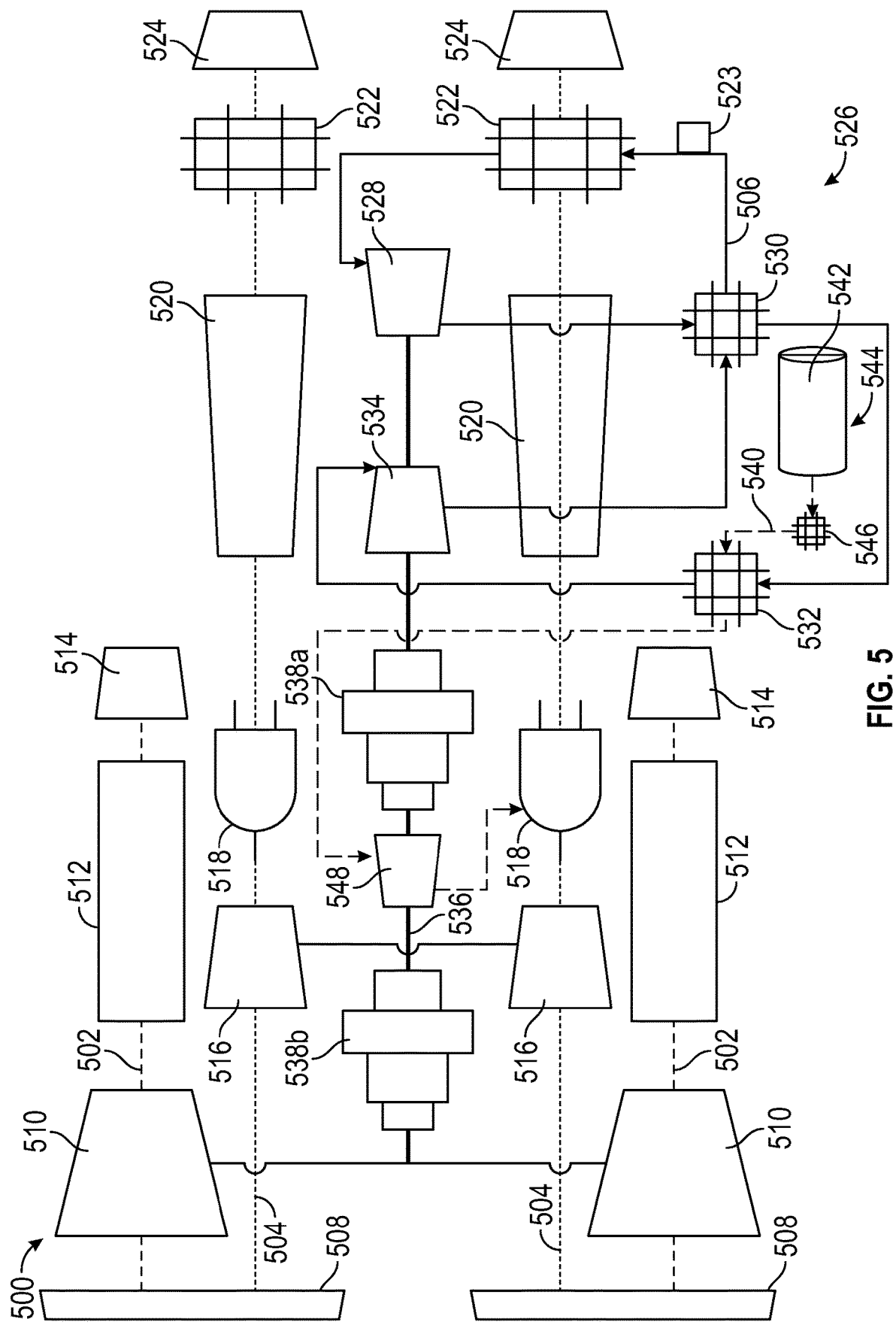
FIG. 5 is a schematic diagram of an aircraft propulsion system in accordance with an embodiment of the present disclosure.

Turning now to FIG. 5, a schematic diagram of an aircraft propulsion system 500 in accordance with an embodiment of the presents disclosure is shown. The aircraft propulsion system 500 may be similar in function as those described above. In this illustrative embodiment, there are four main flow paths of fluids through the aircraft propulsion system 500. The aircraft propulsion system 500 includes a bypass flow path 502, a hot gas flow path 504, a closed-loop flow path 506, and a fuel flow path 540.

The bypass flow path 502 is an air flow path that generates the majority of the thrust for the aircraft propulsion system 500. Air enters the bypass flow path 502 at an air inlet 508. The air is driven by a rotating fan 510 into a bypass duct 512. The air is then ejected or driven out of a bypass nozzle 514.

The hot gas flow path 504 is also an air flow path that is used to generate heat for the aircraft propulsion system 500. Air is sourced from the air inlet 508, passed through the fan 510, and is accelerated through a blower 516. The accelerated air is then passed through a burner 518 where the air is mixed and combusted with a fuel. The hot combusted gas is then passed through a hot stream duct 520 where the flow evens out and reduces turbulence prior to entering a recovery heat exchanger 522 and ejected out a hot stream nozzle 524. In some embodiments, an optional pump 523 may be arranged upstream of recovery heat exchanger 522. For example, the potential phase change to liquid within the closed-loop flow path 506 may enable the use of pumps. Such pumping may enable boosting the working fluid within the closed-loop flow path 506 to a higher pressure that may reduce the required compression work, thus improving overall efficiencies.

The closed-loop flow path 506 is part of a closed loop-supercritical fluid system 526 and contains a supercritical fluid within a fluid line. The closed loop-supercritical fluid system 526 includes a turbine 528, an optional recuperator heat exchanger 530, a cooler heat exchanger 532, a compressor 534, and the recovery heat exchangers 522. As the supercritical fluid passes through the closed-loop flow path 506 it will drive the turbine 528 which in turn drives rotation of a shaft 536.

The fuel flow path 540 is configured to supply fuel from a fuel tank 542 to the burner 518 for combustion with the air in the hot gas flow path 504. The fuel flow path 540 is part of a cryogenic fuel system 544. The cryogenic fuel system 544 provides a supply of fuel that is stored in a cryogenic state (such as liquid hydrogen or the like). In this embodiment, the fuel is extracted from the fuel tank 542 (e.g., by a pump or the like) and passed through a power electronics heat exchanger 546 that begins the warming process of the fuel from its cryogenic state. In some embodiments, an additional heat exchanger may be arranged within a fan stream of the engine, as discussed above, which can result in reduced size heat exchangers throughout the system.

In some embodiments, the cooler heat exchanger 532 provides the cryogenic fuel as a cold sink side for the hot working fluid passing through the closed-loop flow path 506. In some embodiments, an additional heat exchanger may be arranged downstream of the cooler heat exchanger 532, in a similar fan stream position to, for example, cooler heat exchanger 432 shown in FIG. 4. That is, there may be multiple cooler heat exchanges arranged along the closed-loop flow path 506 and arranged in different arrangements along the closed-loop flow path 506 based on thermal considerations, for example, and/or upon physical limitations of the specific engine configurations. The fuel is then passed through the cooler heat exchanger 532 of the closed-loop flow path 506 where the fuel picks up heat from the fluid of the closed-loop flow path 506. The fuel is then passed through a turbo expander 548 and subsequently supplied into the burner 518 for combustion with the air of the hot gas flow path 504. It will be appreciated that the cryogenic fuel could be passed through other engine and/or aircraft heat exchangers as a coolant prior to entering the combustor, and the present flow path is not to be limiting.

The compressor 534 of the closed-loop flow path 506, the blower 516 of the hot gas flow path 504, the fan 510 of the bypass flow path 502, and the turbo expander 548 of the fuel flow path 540 are each coupled to the shaft 536 and thus are driven by the turbine 528. The shaft 536 may include one or more gear systems 538a, 538b. The gear systems 538a, 538b may be configured to step the rotational speed of the shaft to appropriately drive the blower 516, the turbo expander 548, and/or the fan 510.

It will be appreciated that the schematic illustrations herein are more diagrams rather than structural configurations. Further, although it may appear that two of each element are illustrated, such may not be the case, rather a single structure or a multiple of different components may be included. For example, in some embodiments, the ducts and fans illustrated as two separate structures may in fact be portions of an annular structure. In other instances, the elements may be representative of multiple components arranged about a central axis. For example, the burners may be a number of discrete and separate burners (e.g., combustion chambers) arranged about a central axis, which may be defined by the shaft of the propulsion systems described herein. Thus, the illustrations are not to be limiting but rather are provided for explanatory and illustrative purposes only, as described herein.

Figure 6:
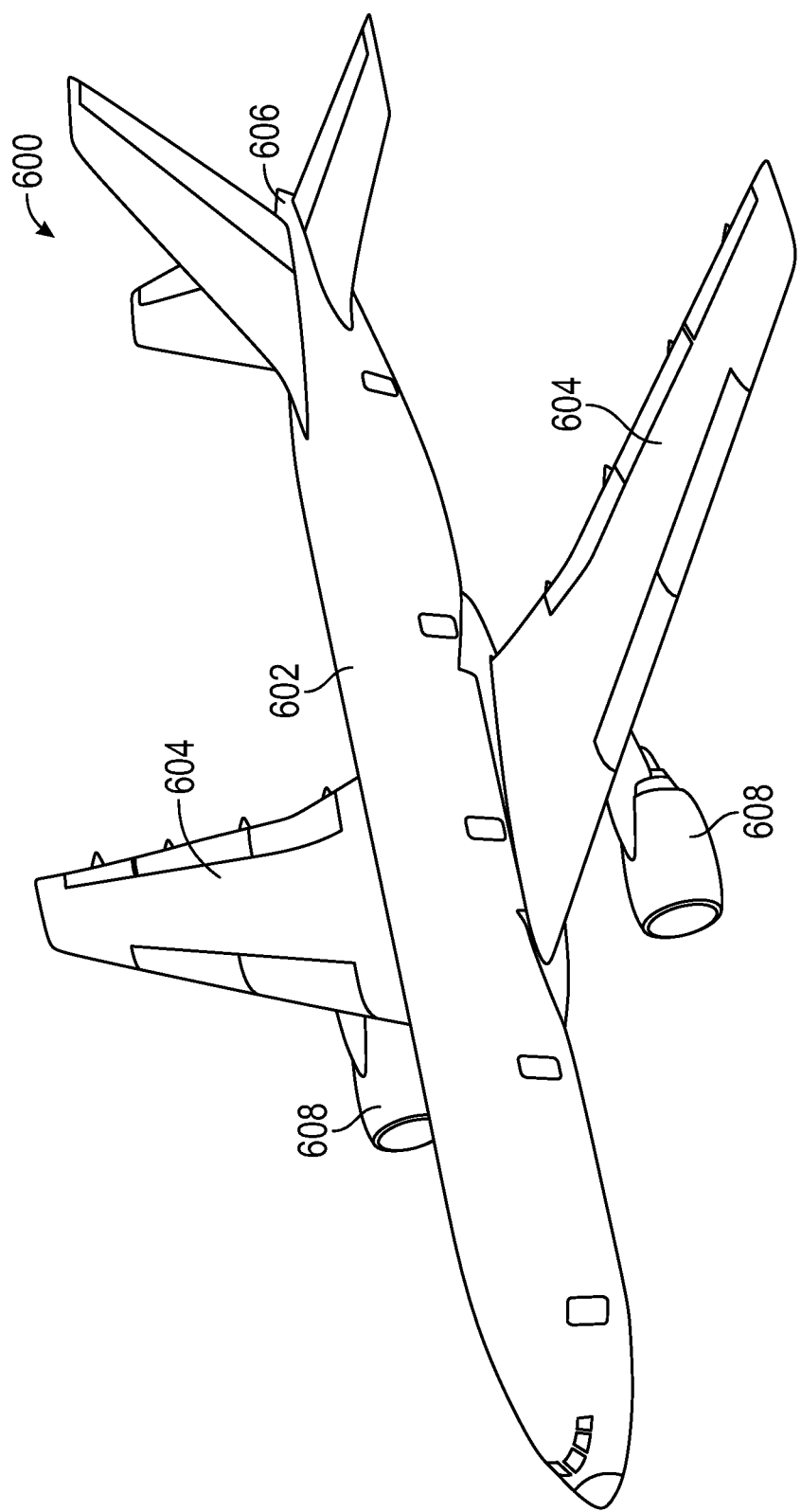
FIG. 6 is a schematic illustration of an aircraft that may incorporate embodiment of the present disclosure.

Turning now to FIG. 6, a schematic illustration of an aircraft 600 that may incorporate embodiments of the present disclosure is shown. The aircraft 600 includes a fuselage 602, wings 604, and a tail 606. In this illustrated embodiment, the aircraft 600 includes wing-mounted aircraft propulsion systems 608. The wing-mounted aircraft propulsion systems 608 may be arranged as the aircraft propulsion systems shown and described above. It will be appreciated that other aircraft configurations may employ the propulsion systems of the present disclosure without departing from the scope of the present disclosure. For example, fuselage-mounted and/or tail-mounted configurations are possible. Further, any number of propulsion systems may be employed, from one to four or more, depending on the aircraft configuration and power and thrust needs thereof.

Advantageously, embodiments of the present disclosure provide for an alternative aircraft propulsion system that may generate less waste and/or pollutants while providing improved efficiency that is not dependent upon altitude. Such aircraft propulsion systems may be zero or near-zero $CO_2$ emission aircraft propulsion systems. A new engine architecture is provided herein where the primary motive force is provided from a closed-loop cycle, rather than the conventional air-breathing Brayton cycles that primarily rely upon combustion to drive rotation of a shaft. Accordingly, the amount of fuel may be reduced, the size of components may be optimized, and improved efficiencies may be achieved. Advantageously, an altitude invariant engine design is provided by embodiments of the present disclosure. Further, improved thermal efficiencies of flight-ready engines are provided by the configurations described herein.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed:

1. An aircraft propulsion system comprising:
   a closed loop-supercritical fluid system having a turbine, a cooler heat exchanger, a compressor, and a recovery heat exchanger arranged in series along a closed-loop flow path of a supercritical fluid;
   a shaft operably coupled to the turbine and the compressor, the shaft and the compressor configured to be rotationally driven by the turbine;
   a fan configured to generate thrust, the fan operably coupled to the shaft to be rotationally driven by the shaft, wherein the shaft is a single, common shaft to which the turbine, the compressor, and the fan are coupled;
   a burner configured to combust a fuel and air from the fan to generate a combusted gas and supply said combusted gas to the recovery heat exchanger of the closed loop-supercritical fluid system and out an exhaust nozzle; and
   a diffuser conduit arranged between the burner and the recovery heat exchanger with the burner arranged to direct a flow of the combusted gas into an inlet of the diffuser conduit and the recovery heat exchanger arranged at an outlet of the diffuser conduit, the diffuser conduit configured to slow down and even out a profile of the flow of the combusted gas prior to entry into the recovery heat exchanger.

2. The aircraft propulsion system of claim 1, wherein the supercritical fluid is $CO_2$ that is passed through the turbine, the cooler heat exchanger, the compressor, and the recovery heat exchanger.

3. The aircraft propulsion system of claim 1, further comprising a gear system coupled to the shaft between the turbine and the fan.

4. The aircraft propulsion system of claim 1, wherein the compressor of the closed loop-supercritical fluid system is arranged on the shaft and rotationally driven by the shaft.

5. The aircraft propulsion system of claim 1, wherein the closed loop-supercritical fluid system further comprises a recuperator heat exchanger arranged between the turbine and the cooler heat exchanger along the closed-loop flow path.

6. The aircraft propulsion system of claim 5, wherein the recuperator heat exchanger is a supercritical fluid-to-supercritical fluid heat exchanger.

7. The aircraft propulsion system of claim 1, further comprising a cryogenic fuel tank configured to supply the fuel to the burner through a fuel flow path, wherein the cooler heat exchanger is a fuel-to-supercritical fluid heat exchanger.

8. The aircraft propulsion system of claim 7, further comprising a turbo expander operably coupled to the shaft and arranged between the cryogenic fuel tank and the burner.

9. The aircraft propulsion system of claim 1, wherein the cooler heat exchanger is an air-to-supercritical fluid heat exchanger.

10. The aircraft propulsion system of claim 9, wherein the cooler heat exchanger is arranged within a bypass duct downstream of the fan.

11. An aircraft propulsion system comprising:
    a bypass flow path defining a flow path of air that passes through an air inlet, through a fan coupled to a shaft, through a bypass duct, and out a bypass nozzle;
    a hot gas flow path defining a flow path of air that passes through the air inlet, through the fan, into a burner for combustion with fuel to generate combusted gas, and through a recovery heat exchanger, and out a hot stream nozzle;
    a closed-loop flow path having a supercritical fluid that passes through a turbine operably coupled to the shaft to drive rotation of the shaft, a cooler heat exchanger, a compressor coupled to the shaft, into the recovery heat exchanger, and back to the turbine; and
    a diffuser conduit arranged between the burner and the recovery heat exchanger with the burner arranged to direct a flow of the combusted gas into an inlet of the diffuser conduit and the recovery heat exchanger arranged at an outlet of the diffuser conduit, the diffuser conduit configured to slow down and even out a profile of the flow of the combusted gas prior to entry into the recovery heat exchanger,
    wherein the turbine of the closed-loop flow path drives rotation of the shaft, the compressor, and the fan, and wherein the shaft is a single, common shaft to which the turbine, the compressor, and the fan are coupled.

12. The aircraft propulsion system of claim 11, further comprising a fuel flow path defining a flow path from a fuel tank to the burner of the hot gas flow path.

13. The aircraft propulsion system of claim 12, further comprising a turbo expander coupled to the shaft and configured to expand the fuel prior to injection into the burner.

14. The aircraft propulsion system of claim 13, further comprising a first gear system coupled to the shaft between the turbine and the turbo expander and a second gear system coupled to the shaft between the turbo expander and the fan.

15. The aircraft propulsion system of claim 12, wherein the fuel in the fuel flow path is cryogenic fuel.

16. The aircraft propulsion system of claim 15, wherein the cryogenic fuel is hydrogen.

17. The aircraft propulsion system of claim 12, wherein the cooler heat exchanger of the closed-loop flow path receives fuel to form the fuel-to-supercritical fluid heat exchanger.

18. The aircraft propulsion system of claim 11, further comprising a gear system coupled to the shaft between the turbine and the fan.

19. The aircraft propulsion system of claim 11, wherein the hot gas flow path further comprises a blower arranged between the fan and the burner to increase a speed of the air passing through the hot gas flow path.

\* \* \* \* \*